United States Patent [19]

Finckh

[11] 4,259,836

[45] Apr. 7, 1981

[54] SOLAR POWER PLANT WITH OPEN GAS TURBINE CIRCUIT

[75] Inventor: Hermann Finckh, Nüremberg, Fed. Rep. of Germany

[73] Assignee: Kraftwerk Union Aktiengesellschaft, Mülheim, Fed. Rep. of Germany

[21] Appl. No.: 58,422

[22] Filed: Jul. 18, 1979

[30] Foreign Application Priority Data

Aug. 2, 1978 [DE] Fed. Rep. of Germany ....... 2833890

[51] Int. Cl.³ ............................................... F02G 3/00
[52] U.S. Cl. ................................... 60/39.33; 60/676; 60/682; 126/117
[58] Field of Search ................ 60/641, 676, 682, 650, 60/39.33; 126/112, 117, 427

[56] References Cited

U.S. PATENT DOCUMENTS 4,167,856  9/1979  Seidel ..................................... 60/641

*Primary Examiner*—Alan Cohan
*Attorney, Agent, or Firm*—Herbert L. Lerner

[57] ABSTRACT

A solar power plant with a gas turbine circuit, having a compressor, a solar heater, a combustion chamber for heating air compressed in the compressor, a turbine and a generator, the solar heater and the combustion chamber being connected between the compressor and the turbine, and a valve for connecting and disconnecting the solar heater to the circuit, the combustion chamber having double walls defining an outer space between the walls and an inner space, the outer space of the combustion chamber being connected in series with the solar heater upstream thereof, in flow direction of the compressed air, the inner space of the combustion chamber being connected downstream of the solar heater in flow direction of the compressed air, and the valve connecting the outer space and the inner space of the combustion chamber to each other.

5 Claims, 3 Drawing Figures

SOLAR POWER PLANT WITH OPEN GAS TURBINE CIRCUIT

The invention relates to a solar power plant with a gas turbine circuit including a solar heater, a combustion chamber, a turbine and a generator, wherein the solar heater and the combustion chamber for heating the compressed air are connected between the compressor and the turbine, and in which a valve installation for connecting and disconnecting the solar heater is provided.

Such a solar power plant is known from German Published, Non-Prosecuted Application DE-OS No. 25 53 283. For selectable operation with the solar heater or the combustion chamber in this publication, the combustion chamber is connected parallel to the solar heater and a three-way valve is provided which divides up the stream of compressed air.

It is accordingly an object of the invention to provide a solar power plant with an open gas turbine circuit which overcomes the disadvantage of the heretofore known devices of this general type, and in which a minimum of pressure loss occurs with the solar heater connected as well as disconnected, and furthermore in which a mixing valve for dividing up the compressed air stream can be dispensed with.

With the foregoing and other objects in view there is provided, in accordance with the invention a solar power plant with a gas turbine circuit, having a compressor, a solar heater, a combustion chamber for heating air compressed in the compressor, a turbine and a generator, the solar heater and the combustion chamber being connected between the compressor and the turbine, and valve means for connecting and disconnecting the solar heater to the circuit, the combustion chamber having double walls defining an outer space between the walls and an inner space, the outer space of the combustion chamber being connected in series with the solar heater upstream thereof, in flow direction of the compressed air, and the valve means connecting the outer space and the inner space of the combustion chamber to each other.

In accordance with another feature of the invention, there is provided a line connecting the solar heater to the combustion chamber, the line having double walls defining an outer space between the walls and an inner space, the outer space of the combustion chamber being connected in series to the outer space of the connecting line, and the inner space of the combustion chamber being connected to the inner space of the connecting line.

In accordance with a further feature of the invention, there is provided an exhaust gas heat exchanger connected between the compressor and the combustion chamber.

In accordance with an additional feature of the invention, the valve means comprises a single valve having a deflection plate and a rotatably supported hollow cylindrical body switchable between a first and a second switching position for controlling the compressed air flow between the combustion chamber and solar heater, in the first switching position the outer space of the combustion chamber being directly connected to the inner space of the combustion chamber by the deflection plate, and in the second switching position the outer space of the combustion chamber being connected to the outer space of the connecting line and the inner space of the combustion chamber being connected to the inner space of the connecting line.

In accordance with a concomitant feature of the invention, there is provided a waste heat steam generator connected down stream of the turbine, in flow direction of the air.

Other features which are considered as characteristic for the invention are set forth in the appended claims.

Although the invention is illustrated and described herein as embodied in a solar power plant with open gas turbine circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
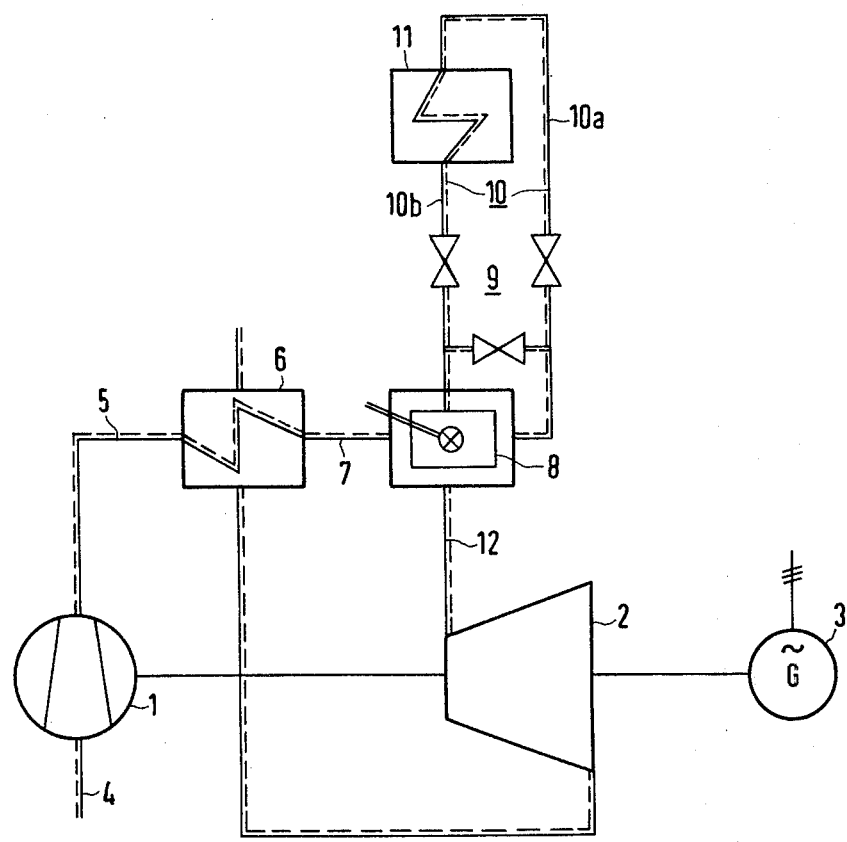
FIG. 1 is a schematic circuit diagram of the solar power plant of the invention.

Referring now to the figures of the drawing and first, particularly, to FIG. 1 thereof, there is seen a compressor 1 together with a turbine 2 and the rotor of a generator 3, disposed on one shaft. The compressor 1 draws-in air through the line 4 and compresses it. The compressed air flows through a line 5, the high-pressure part of an exhaust-gas heat exchanger 6 and a line 7 into the outer space of a combustion chamber 8 between double walls. From the combustion chamber 8, the air flows through a valve combination 9, shown and described in detail in FIGS. 2 and 3. From the valve combination 9, the air travels either directly into the interior of the combustion chamber 8 or, through the outer space 10a of a connecting line 10 having concentric tubes, to the solar heater 11 which conventionally receives sun rays for heating the flowing air. After the solar heater 11, the air flows through the interior 10b of the connecting line 10 into the interior or inner space of the combustion chamber 8 inside the inner wall, where the air is heated further by combustion, if required. The air so heated then flows through the line 12 to the turbine 2 and from there to the low-pressure part of the exhaust gas heat exchanger 6.

Figure 2:
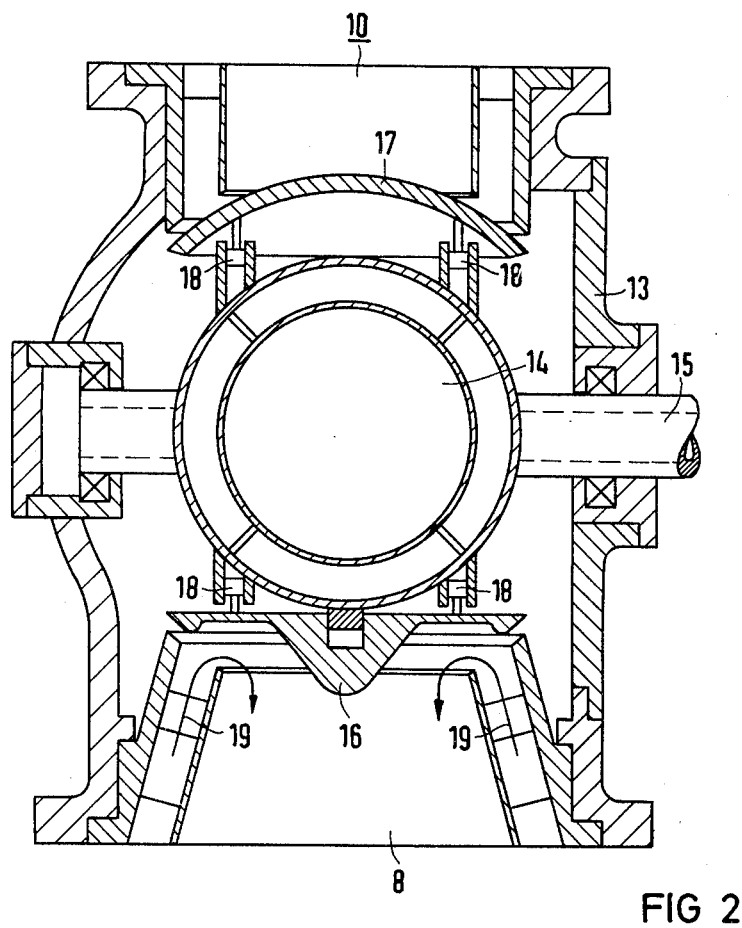
FIG. 2 is a diagrammatic cross-sectional view of a valve, with which the switching from solar operation to combustion chamber operation can be performed.

In FIG. 2, the connecting line between the combustion chamber 8 and the connecting line 10 is shown. The valve combination 9 from FIG. 1 here comprises a single valve 13, which contains a double-walled hollow cylindrical body 14 which is rotatably supported about a shaft 15. The hollow cylindrical body is followed at the bottom by a deflection plate 16 and at the top by a heat shield 17. The deflection plate 16 also acts as a heat shield and can be pushed by means of servo motors 18 against the outer wall of the combustion chamber 8. In this way, the air flowing in the outer space of the combustion chamber is deflected at the deflection plate 16 in the direction of the arrows 19 into the interior of the combustion chamber. In the interior of the chamber 8, combustion can then take place in a conventional manner. This construction has the particular advantage that the respective inner wall of the combustion chamber 8 and the connecting line 10 need not withstand any appreciable pressure difference. In addition, heat losses are automatically utilized for preheating the cold air that flows in from the outside.

Figure 3:
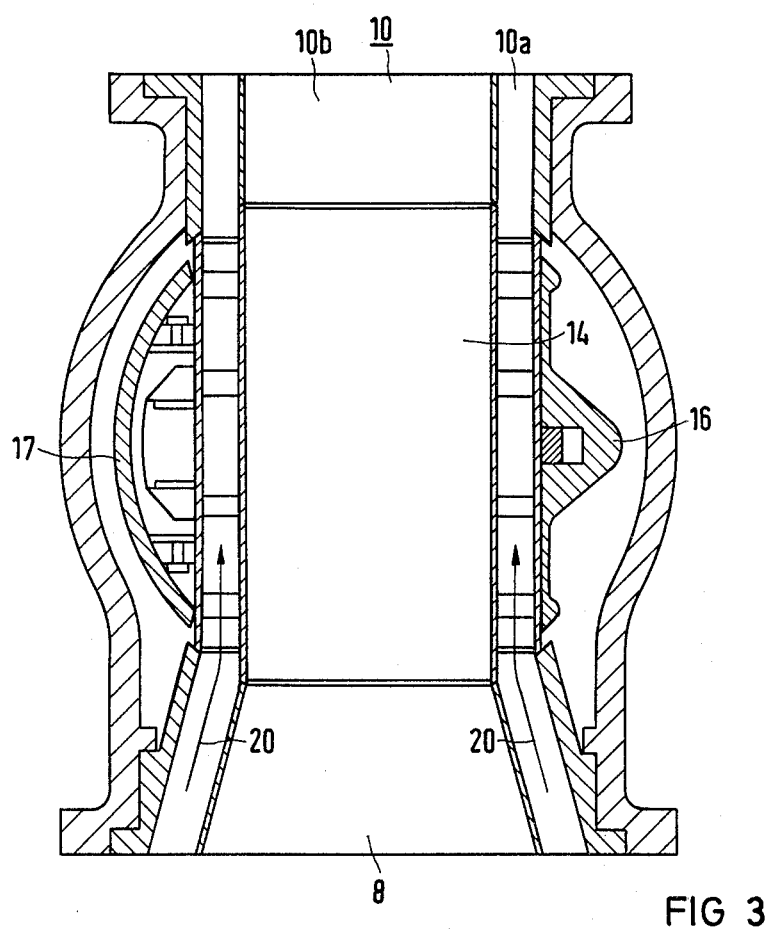
FIG. 3 is a cross-sectional view of the valve of FIG. 2 in a different operating position, taken perpendicular to the view shown in FIG. 2.

FIG. 3, as mentioned above, shows a cross section through the valve 13 perpendicular to the cross section shown in FIG. 2, with the shaft 15 rotated through 90°. In this position, the hollow cylindrical body 14 is connected to the connecting line 10 as well as to the upper end of the combustion chamber 8. With the valve set in this way, the heat shield 17 and the deflection plate 16 are located to the left and right, respectively, next to the hollow cylindrical body 14. In this position, the air flows in the direction of the arrows 20 from the outer space of the combustion chamber 8 through the outer space of the hollow cylindrical body 14 into the outer space 10a of the connecting line 10. The air heated in the solar heater, which is not shown in FIG. 3, returns through the interior 10b of the connecting line 10 and flows into the interior of the combustion chamber 8, where the air heated in the solar heater 11 can be heated further, if necessary.

With this series connection of the solar heater and the combustion chamber, it is thus sufficient to provide a valve with only two valve positions. In addition, no separate bypass line is necessary if the solar heater is disconnected. The valve 13 makes pure combustion chamber operation possible by simply deflecting the air flowing-in in the outer space, according to the illustration in FIG. 2.

Even better utilization of the heat supplied is obtained if the turbine 2 is followed by a conventional non-illustrated waste heat steam generator in lieu of the exhaust gas heat exchanger 6.

There are claimed:

1. In a solar power plant with a gas turbine circuit, having a compressor, a solar heater, a combustion chamber for heating air compressed in said compressor, a turbine and a generator, said solar heater and said combustion chamber being connected between said compressor and said turbine, and valve means for connecting and disconnecting said solar heater to the circuit, said combustion chamber having double walls defining an outer space between said walls and an inner space, said outer space of said combustion chamber being connected in series with said solar heater upstream thereof, in flow direction of the compressed air, said inner space of said combustion chamber being connected downstream of said solar heater in flow direction of the compressed air, and said valve means connecting said outer space and said inner space of said combustion chamber to each other.

2. Solar power plant according to claim 1, including a line connecting said solar heater to said combustion chamber, said line having double walls defining an outer space between said walls and an inner space, said outer space of said combustion chamber being connected in series to said outer space of said connecting line, and said inner space of said combustion chamber being connected to said inner space of said connecting line.

3. Solar power plant according to claim 1, including an exhaust gas heat exchanger connected between said compressor and said combustion chamber.

4. Solar power plant according to claim 2, wherein said valve means comprises a single valve having a deflection plate and a rotatably supported hollow cylindrical body switchable between a first and a second switching position for controlling the compressed air flow between said combustion chamber and solar heater, in said first switching position said outer space of said combustion chamber being directly connected to said inner space of said combustion chamber by said deflection plate, and in said second switching position said outer space of said combustion chamber being connected to said outer space of said connecting line and said inner space of said combustion chamber being connected to said inner space of said connecting line.

5. Solar power plant according to claim 1 or 2, including a waste heat steam generator connected down stream of said turbine, in flow direction of the air.

* * * * *